C. W. GEIST & C. FREY.
PRESSURE RELEASE COLLAR.
APPLICATION FILED MAY 13, 1918.
1,291,475.
Patented Jan. 14, 1919.
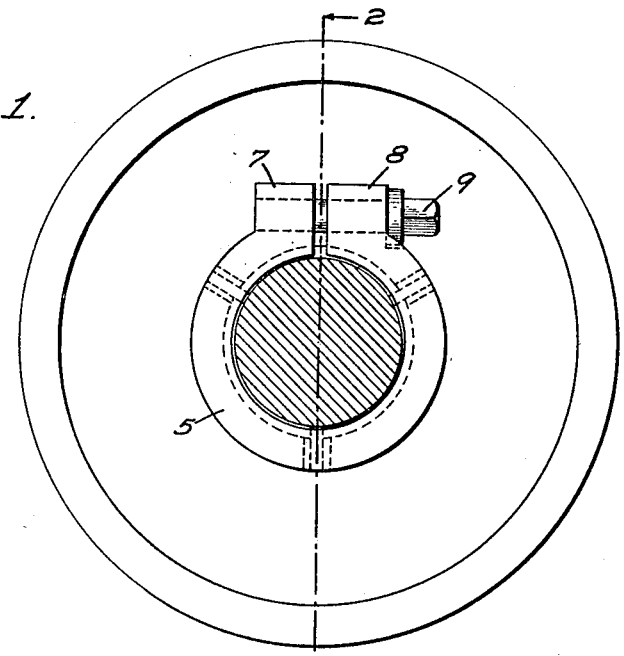
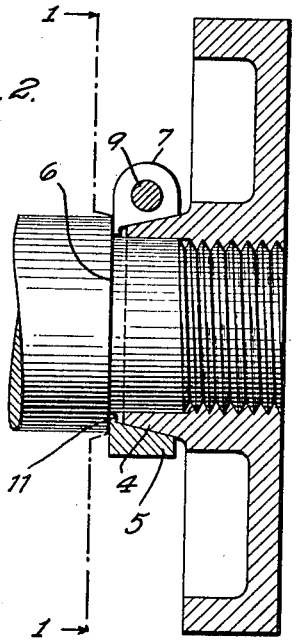
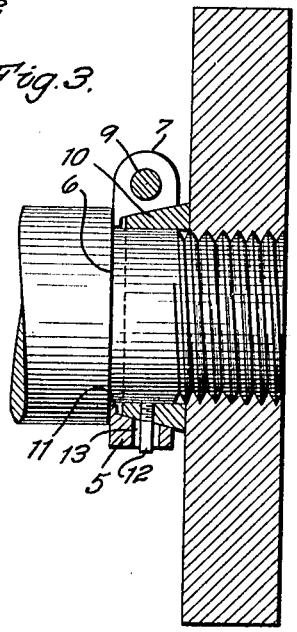
Inventors
Clifford W. Geist
Charles Frey
By Walter F. Murray Attorney.

UNITED STATES PATENT OFFICE.

CLIFFORD W. GEIST AND CHARLES FREY, OF CINCINNATI, OHIO.

PRESSURE-RELEASE COLLAR.

1,291,475.  Specification of Letters Patent.  Patented Jan. 14, 1919.

Application filed May 13, 1918. Serial No. 234,140.

*To all whom it may concern:*

Be it known that we, CLIFFORD W. GEIST and CHARLES FREY, citizens of the United States of America, and residents of Cincinnati, in the county of Hamilton and State of Ohio, have invented a new and useful Improvement in Pressure-Release Collars, of which the following is a specification.

An object of our invention is to produce a pressure release collar which will permit the easy removal of face plates and chucks from the spindles of lathes, milling machines, grinders, etc., without having to resort to the use of a hammer or other tool which would be liable to injure the machine or the face plate or chuck attached thereto.

This and other objects are attained in the pressure release collar described in the following specification and illustrated in the accompanying drawing, in which;

Figure 1 is a sectional view taken on the line 1—1 of Fig. 2.

Fig. 2 is a sectional view taken on the line 2—2 of Fig. 1.

Fig. 3 is a sectional view similar to Fig. 2, but of a modified form of our invention.

Our invention consists in turning the hub of standard face plates to produce a tapered lug 4, and then providing a collar 5, having an internal taper corresponding to that of the lug, which is designed to extend beyond the lug and bear against the usual shoulder 6 provided on the spindle of the machine tool. Collar 5 is split, lugs 7 and 8 through which a binder screw 9 passes, being provided for contracting the collar.

In Fig. 3 the construction of the collar is the same as in Fig. 2, but the tapered lug 10 is separate from the face plate which is one having plain faces.

In using our invention the collar is reduced to its smallest diameter by means of binder screw 9. It is then placed over the spindle with the smaller diameter of its taper adjacent to shoulder 6. The face plate with tapered lug in the positions shown in Figs. 2 and 3, is then placed upon the spindle and screwed up tight with the lug wedged within the collar. The work which is fastened to the face plate is then turned, the plate becoming more and more tightly secured to the spindle. In the ordinary manner of mounting face plates upon the spindles of machine tools it is difficult to remove a face plate which has thus been tightened upon its mounting spindle. In our construction it is but necessary to apply a wrench to the head of binder screw 9 and to thereby loosen the screw to permit the collar to expand. This releases it from engagement with shoulder 6 and leaves it loose upon the tapered lug 4 or 10. The face plate is thus freed from binding engagement with the spindle and can be easily removed therefrom.

A feature of our invention lies in the provision of an inturned flange 11 on the collar, which is a sliding fit on the spindle when the collar is drawn up tight. This prevents canting or binding of the collar upon the cone in other than its proper position, by guiding it properly upon the cone.

Another feature of our invention is the provision of pins 12 which are secured preferably in the separate cone 10 and the ends of which occupy enlarged openings 13 in the collar. This permits the collar and separate cone to be handled as a unit and yet permits relative movement of these two elements sufficiently to permit them to perform their functions. Thus the pieces are prevented from becoming lost with relation to one another.

It will be seen that by means of our invention, face plates, chucks, and similar attachments for lathes, milling machines, grinders, etc., may be easily removed from their mounting spindles without having to resort to the use of hammers, spanner wrenches and other tools which in their use would be liable to damage the attachments or machine tools to which they are attached.

Having thus described our invention, what we claim is:

1. In combination with a rotatively mounted spindle having a shouldered and screw threaded end, an attachment mounted on the screw threaded end, a conically shaped annular lug located between the attachment and the shoulder, and an expansible collar located between the shoulder and the lug, having a conically shaped inner surface adapted to fit the lug and to bear against the shoulder when the collar is contracted and when the attachment is tightly mounted upon the screw threaded end.

2. In combination with a rotatively mounted spindle having a shouldered and screw threaded end, an attachment screwed on the screw threaded end, a tapered annular lug reciprocally mounted on the screw threaded end between the attachment and the shoulder, a split collar having a tapered inner surface of the same taper as the lug and located between the shoulder and the lug, and means adapted to contract the collar and retain it in contracted position when the attachment is screwed upon the end tightly to bring the collar in engagement with the shoulder, said means being adapted to release the collar to permit it to move to expanded position, whereby the attachment will be released.

In testimony whereof, we have hereunto subscribed our names this 11th day of May, 1918.

CLIFFORD W. GEIST.
CHARLES FREY.

Witnesses:
W. THORNTON BOGERT,
WALTER F. MURRAY.

Copies of this patent may be obtained for five cents each, by addressing the "Commissioner of Patents, Washington, D. C."